US012014198B2

United States Patent
Hobson et al.

(10) Patent No.: US 12,014,198 B2
(45) Date of Patent: Jun. 18, 2024

(54) RUNNING SMALLER MEMORY-ADDRESS WIDTH PROGRAM CODE IN A LARGER MEMORY-ADDRESS WIDTH ADDRESS SPACE

(71) Applicant: INTERNATIONAL BUSINESS MACHINES CORPORATION, Armonk, NY (US)

(72) Inventors: Stephen James Hobson, Hampton (GB); Catherine Mary Moxey, Newbury (GB); Christian Jacobi, West Park, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 581 days.

(21) Appl. No.: 17/212,448

(22) Filed: Mar. 25, 2021

(65) Prior Publication Data

US 2022/0308906 A1    Sep. 29, 2022

(51) Int. Cl.
    *G06F 9/455*    (2018.01)
(52) U.S. Cl.
    CPC ............ *G06F 9/45558* (2013.01); *G06F 2009/45583* (2013.01)
(58) Field of Classification Search
    None
    See application file for complete search history.

(56) References Cited

U.S. PATENT DOCUMENTS

| 6,725,366 | B1 | 4/2004 | Swanberg |
| 9,459,872 | B2 | 10/2016 | Greiner |
| 10,120,663 | B2 | 11/2018 | Hasabnis |

(Continued)

FOREIGN PATENT DOCUMENTS

| CN | 1343331 A | 4/2002 |
| CN | 103279387 A | 9/2013 |

(Continued)

OTHER PUBLICATIONS

Wikipedia, "Wow64", Wikipedia, the free encyclopedia, [accessed on Mar. 8, 2021], 4 Pages, Retrieved from the Internet: <URL: https://en.wikipedia.org/wiki/WoW64>.

(Continued)

*Primary Examiner* — Adam Lee
(74) *Attorney, Agent, or Firm* — CANTOR COLBURN LLP; Teddi Maranzano (57) ABSTRACT

Method and system are provided for running a smaller memory-address width program in a larger memory-address width address space. The method includes: dividing a smaller memory-address width program executable code into a set of portions; reserving a first virtual storage area in a part of an address space accessed using a smaller memory-address width address; and reserving a set of second virtual storage areas in a part of the address space accessed using a larger memory-address width address to accommodate the program executable code. The method provides a relocation mechanism to relocate a processor thread by translating using a relocation factor from an address in the reserved first virtual storage area to the one of the reserved second virtual storage areas containing the executable code.

20 Claims, 6 Drawing Sheets

(56) References Cited

U.S. PATENT DOCUMENTS

| | | | |
|---|---|---|---|
| 2015/0242212 A1 | 8/2015 | Sudhakar | |
| 2015/0277869 A1 | 10/2015 | Gschwind | |
| 2016/0259587 A1* | 9/2016 | Yost | G06F 9/5016 |
| 2018/0081736 A1 | 3/2018 | Gainey, Jr. | |

FOREIGN PATENT DOCUMENTS

| | | |
|---|---|---|
| CN | 105095095 A | 11/2015 |
| CN | 111338640 A | 6/2020 |
| CN | 116917857 A | 10/2023 |
| WO | 2022200894 A1 | 9/2022 |

OTHER PUBLICATIONS

Wikipedia, "Thunk", Wikipedia, the free encyclopedia, [accessed on Mar. 8, 2021], 6 Pages, Retrieved from the Internet: <URL: https://en.wikipedia.org/wiki/Thunk>.

Wikipedia, "Static Library", Wikipedia, the free encyclopedia, [accessed on Mar. 25, 2021], 3 Pages, Retrieved from the Internet: https://en.wikipedia.org/wiki/Static_library.

Wikipedia, "Dynamic Linker", Wikipedia, the free encyclopedia, [accessed on Mar. 25, 2021], 5 Pages, Retrieved from the Internet: https://en.wikipedia.org/wiki/Dynamic_linker.

Wikipedia, "Evaluation Strategy", Wikipedia, the free encyclopedia, [accessed on Mar. 25, 2021], 9 Pages, Retrieved from the Internet: https://en.wikipedia.org/wiki/Evaluation_strategy.

International Searching Authority, "Notification of Transmittal of the International Search Report and the Written Opinion of the International Searching Authority, or Declaration," Patent Cooperation Treaty, May 24, 2022, 9 pages, International Application No. PCT/IB2022/052001.

Hobson, et al., "Running Smaller Memory-Address Width Program Code in a Larger Memory-Address Width Address Space," Application and Drawings, Filed on Mar. 7, 2022, 26 Pages, Related JP Patent Application Serial No. 2023-557727.

Hobson, et al., "Running Smaller Memory-Address Width Program Code in a Larger Memory-Address Width Address Space," Application and Drawings, Filed on Mar. 7, 2022, 34 Pages, Related DE Patent Application Serial No. 11 2022 001 713.9.

* cited by examiner

RUNNING SMALLER MEMORY-ADDRESS WIDTH PROGRAM CODE IN A LARGER MEMORY-ADDRESS WIDTH ADDRESS SPACE

BACKGROUND

The present invention relates to computer addressing mode, and more specifically, to running a smaller memory-address width program in a larger memory-address width address space.

An addressing mode (AMODE) is used to identify the number of bits that a program uses for storage addresses. AMODE-31 programs use 31-bit storage addresses; they use four-byte fields and four-byte registers to contain them. AMODE-64 programs use 64-bit storage addresses; they use eight-byte fields and eight-byte registers to contain them.

A residence mode (RMODE) is used to describe where, in memory, the program itself must reside. RMODE-31 programs must reside in storage that can be accessed using a 31-bit address, that is in the first 2 GB of the address space, also called "below the bar". RMODE-64 programs must reside in storage that can be accessed using a 64-bit address, that is anywhere in a 64-bit architecture address space. RMODE-64 programs can, and preferentially do, reside in storage above the first 2 GB, also called "above the bar".

Modern computer architectures typically support 64-bit virtual storage addresses, but older versions of these same architectures typically supported smaller addresses such as 8-bit, 16-bit, 24-bit, 31-bit, or 32-bit. 64-bit architectures are designed to run AMODE-64 programs, but many can also run programs from older versions of the architecture. Technologies that allow this include emulation and bimodal or trimodal operation. Other useful technologies applicable to this include thunking used to provide interoperability between software modules whose routines cannot call each other and in which code is inserted into a calling process (and potentially into the return processing).

Bimodal operation allows execution of programs in two addressing modes. Application servers use this capability extensively; it allows users to continue exploiting applications developed over many decades by running them unchanged on the most modern processors. Also, for various reasons, users continue to develop new AMODE-31 programs. In installations, the amount of below-the-bar storage occupied by RMODE-31 programs can be large and increasing. Users of such installations would like to "free up" below-the-bar storage by RMODE-31 programs so that more storage is available for data, or more programs can be loaded into the address space, or both.

This problem applies in other cases where there is a need to run application programs built for a smaller memory-address width than the runtime can support.

SUMMARY

According to an aspect of the present invention there is provided a computer-implemented method for running a smaller memory-address width program in a larger memory-address width address space comprising: dividing a smaller memory-address width program executable code into a set of portions; reserving a first virtual storage area in a part of an address space accessed using a smaller memory-address width address; reserving a set of second virtual storage areas in a part of the address space accessed using a larger memory-address width address to accommodate the program executable code; and providing a relocation factor for a processor thread to translate from an address in the reserved first virtual storage area to the one of the reserved second virtual storage areas containing the executable code.

According to another aspect of the present invention there is provided a computer program product for running a smaller memory-address width program in a larger memory-address width address space, wherein at a runtime of a program the method comprising: receiving an access request to executable code of the program on a processor thread; looking up a reserved first storage area for the processor thread in a part of an address space accessed using a smaller memory-address width address; looking up a relocation factor for the processor thread to obtain a relocation factor; and translating using the relocation factor from an address in the reserved first storage area to one of a set of second virtual storage areas in a part of the address space accessed using a larger memory-address width address accommodating the program executable code, wherein the reserved second storage area contains the code that is executing in the reserved first storage area.

According to another aspect of the present invention there is provided a computer system for running a smaller memory-address width program in a larger memory-address width address space comprising: a processor and a memory configured to provide computer program instructions to the processor to execute the function of the components; and an address reserving component including: a dividing component for dividing a smaller memory-address width program executable code into a set of portions; a first storage area reserving component for reserving a first virtual storage area in a part of an address space accessed using a smaller memory-address width address; a second storage area reserving component for reserving a set of second virtual storage areas in a part of the address space accessed using a larger memory-address width address to accommodate the program executable code; and a relocation factor providing component for providing a relocation factor for a processor thread to translate from an address in the reserved first virtual storage area to the one of the reserved second virtual storage areas containing the executable code.

The system may further include a runtime relocating component including: an access request receiving component for receiving an access request to executable code of the program on a processor thread; a first storage area look up component for looking up the relocation area register for the processor thread to identify a reserved first storage area; a relocation factor look up component for looking up the relocation factor register for the processor thread to obtain a relocation factor; and an address translating component for translating using the relocation factor from an address in the reserved first storage area to the one of the reserved second storage areas containing the code that is executing in the reserved first storage area.

According to another aspect of the present invention there is provided a computer program product for running a smaller memory-address width program in a larger memory-address width address space, the computer program product comprising a computer readable storage medium having program instructions embodied therewith, the program instructions executable by a processor to cause the processor to: divide a smaller memory-address width program executable code into a set of portions; reserve a first virtual storage area in a part of an address space accessed using a smaller memory-address width address; reserve a set of second virtual storage areas in a part of the address space accessed using a larger memory-address width address to accommodate the program executable code; and provide a relocation factor for a processor thread to translate from an address in the reserved first virtual storage area to the one of the reserved second virtual storage areas containing the executable code.

According to another aspect of the present invention there is provided a computer program product for running a smaller memory-address width program in a larger memory-address width address space, the computer program product comprising a computer readable storage medium having program instructions embodied therewith, the program instructions executable by a processor to cause the processor to: receive an access request to executable code of the program on a processor thread; look up a reserved first storage area for the processor thread in a part of an address space accessed using a smaller memory-address width address; look up a relocation factor for the processor thread to obtain a relocation factor; and translate using the relocation factor from an address in the reserved first storage area to one of a set of second virtual storage areas in a part of the address space accessed using a larger memory-address width address accommodating the program executable code, wherein the reserved second storage area contains the code that is executing in the reserved first storage area.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numbers may be repeated among the Figures to indicate corresponding or analogous features.

DETAILED DESCRIPTION

The described method and system allows smaller memory-address width programs to reside outside the smaller memory-address width addressable portion of an address space and run in smaller memory-address width addressing mode. This enables a smaller memory-address width program to run on a larger memory-address width architecture whilst freeing up space in the smaller memory-address width portion of the address space and making use of the larger available space of the larger memory-address width portion of the address space.

The term "smaller memory-address width" and "larger memory-address width" addresses are used to describe any suitable combination pair of smaller memory-address width address and larger memory-address width address. In the example described, the smaller memory-address width address is a 31-bit address and the larger memory-address width address is the 64-bit address.

In the described method, for any one program, while it is executing, there are two virtual storage areas in the same address space. The first is located within that part of the address space where smaller width addresses suffice, the second is one of a set of areas located within the much larger part of the address space which requires larger width addresses. A relocation mechanism is provided that allows a thread to use addresses within the first area to access the executable code that is located within the second area.

Figure 1:
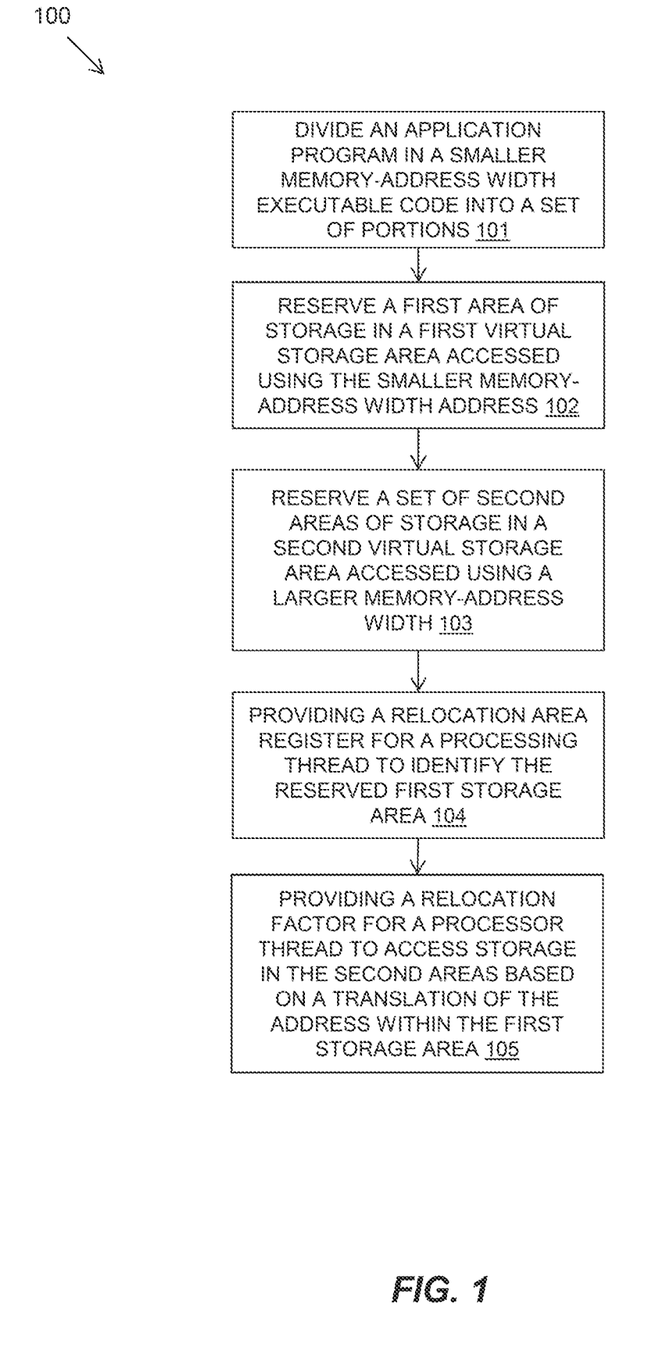
FIG. 1 is a flow diagram of an example embodiment of a method in accordance with the present invention.

Referring to FIG. 1, a flow diagram 100 shows an example embodiment of the described method.

An application program in a smaller memory-address width executable code is divided 101 into a set of portions. The division takes into account linkages between to ensure that a portion does not contain pointers into another portion. A single executable object of statically linked programs works as a portion because any pointers it contains do not point into any other such objects. This observation simplifies the process of dividing the application code. Additionally, the division may include more than one object in the same portion and an existing object might be divisible into two objects provided that code in one object does not statically link into code in the other object.

A first virtual storage area accessed by a smaller memory-address width address is reserved 102 with a size at least large enough to contain a largest of the set of code portions. A set of second storage areas that must be accessed by a larger memory-address width address is reserved 103. Each of the set of second storage areas may be the same size as the first area. Alternatively, the second storage areas may be allocated so that each is matched to the size of the application portion it contains.

The method provides 104 a relocation area register for a processor thread to identify the reserved first storage area, and provides 105 a relocation factor register with a relocation factor for the processor thread to access the set of second storage areas based on a translation of the address within the first storage area.

Software needs to provide these values to the hardware which keeps them available for its own use. The term "register" is used as a common generic term for a memory location used in this way. In one example implementation, this may use fields in the z/Architecture (z/Architecture is a trademark of International Business Machines Corporation) dispatchable unit control table (DUCT) which may also be described as a register.

At runtime, a method running the application program uses a relocation mechanism to look up the relocation area register associated with a processor thread to identify an address in the reserved first storage area. The relocation mechanism also looks up the relocation factor register for the processor thread to provide a translation of the address within the first storage area to allow access to one of the sets of second storage areas. This allows a thread to use the smaller memory-address width address to access the executable code in one of the set of second storage areas. Different relocation factors are provided for different threads and for a same thread at different times to access different sets of second storage areas obtaining different executable code using a same first storage area.

Using an example of a 31-bit addressing mode (AMODE-31) and a 64-bit addressing mode (64-AMODE), the method may use below-the-bar virtual storage addresses to access AMODE-31 executable code in above-the-bar virtual storage. This allows the executable code to refer to itself (for example when branching or accessing constants) using 31-bit addresses. The executable code can also still use 31-bit addresses to access data and other programs in below-the-bar storage. In this way, the executable code can run in AMODE-31 even though it is resident in storage above-the bar (RMODE-31).

When a 31-bit address is used to access the above-the-bar virtual storage that contains the executable code, a relocation mechanism adds a 64-bit displacement or relocation factor associated with the thread to the 31-bit address to calculate the 64-bit address. This addition process is transparent to the executing code.

Different relocation factors can be used so that different threads (or the same thread at different times) can access different above-the-bar storage containing different executable code. In this way, the same range of below-the-bar virtual addresses can be used for different portions of executable AMODE-31 code residing in different ranges of above-the-bar virtual addresses.

Figure 2:
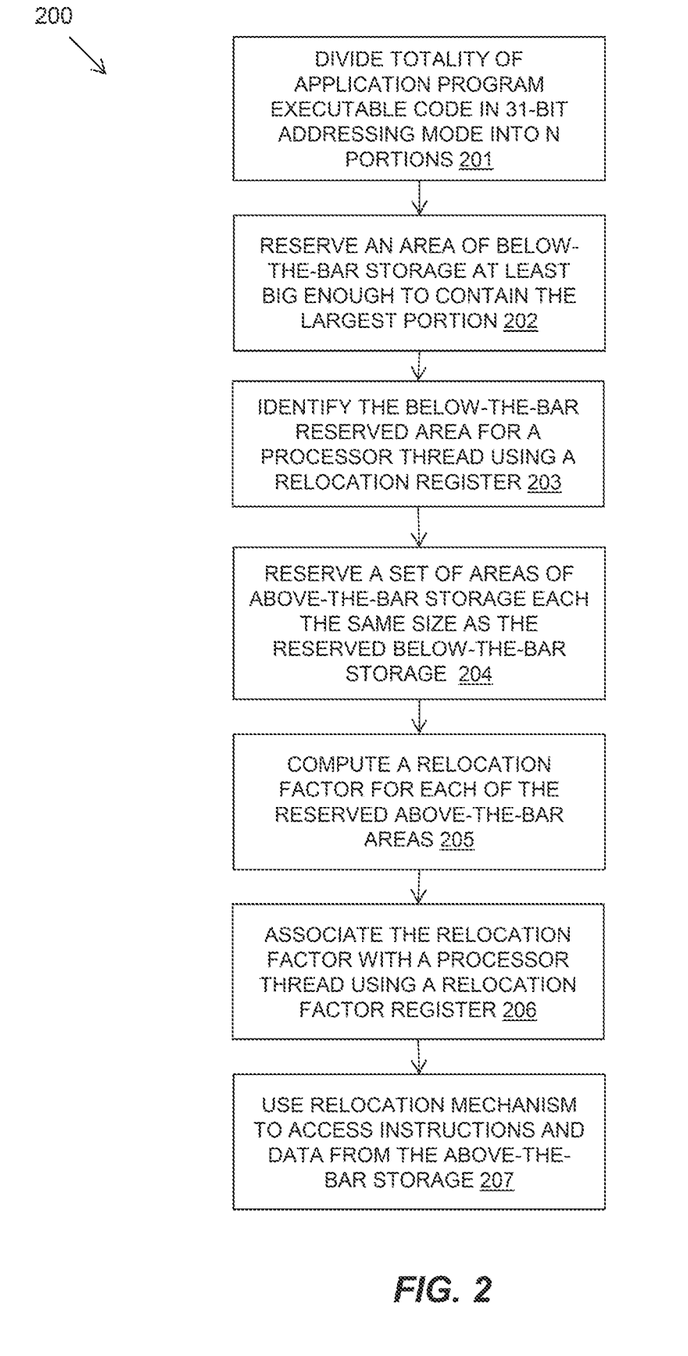
FIG. 2 is a flow diagram of an example embodiment of an aspect of a method in accordance with the present invention.

Referring to FIG. 2, a flow diagram 200 shows a more detailed example embodiment of the described method. In this example embodiment, the smaller memory-address width address is a 31-bit address with the first virtual storage space is "below-the-bar", which is in the first 2 GB of the address space, and the larger memory-address width address is a 64-bit address with the second virtual storage space being "above-the-bar". The method described in relation to FIG. 2 may be used for other pairs of smaller memory-address width and larger memory-address width addresses.

The method divides 201 the totality of an application program executable code in a 31-bit addressing mode into several portions. More details of this division are described further below that accommodate linkages between programs.

The method reserves 202 an area of below-the-bar storage at least big enough to contain the largest of these portions. The method identifies 203 the reserved area in the below-the-bar storage using a relocation area register associated with a processor thread. For example, the relocation-area register may contain the address and length of the area or the start and end addresses of the area. The relocation-area register may be provided in much the same way that the instruction address register is associated with the processor thread.

The method reserves 204 a set of areas of above-the-bar storage with each area being the same size as the reserved area of below-the-bar storage. The number of areas in the set of areas is at least equal to the number of portions obtained by the division of the executable code. The method computes 205 a relocation factor for each of the set of reserved above-the-bar areas, where adding the relocation factor to an address at a displacement within the below-the-bar area gives the address at the same displacement within the above-the-bar area.

The method associates 206 the computed relocation factor with the processor thread using a relocation factor register, again in much the same way that the instruction address register is associated with the processor thread.

The method uses 207 a relocation mechanism to access the above-the-bar storage with relocation from the below-the-bar addresses in the below-the-bar storage.

Figure 3:
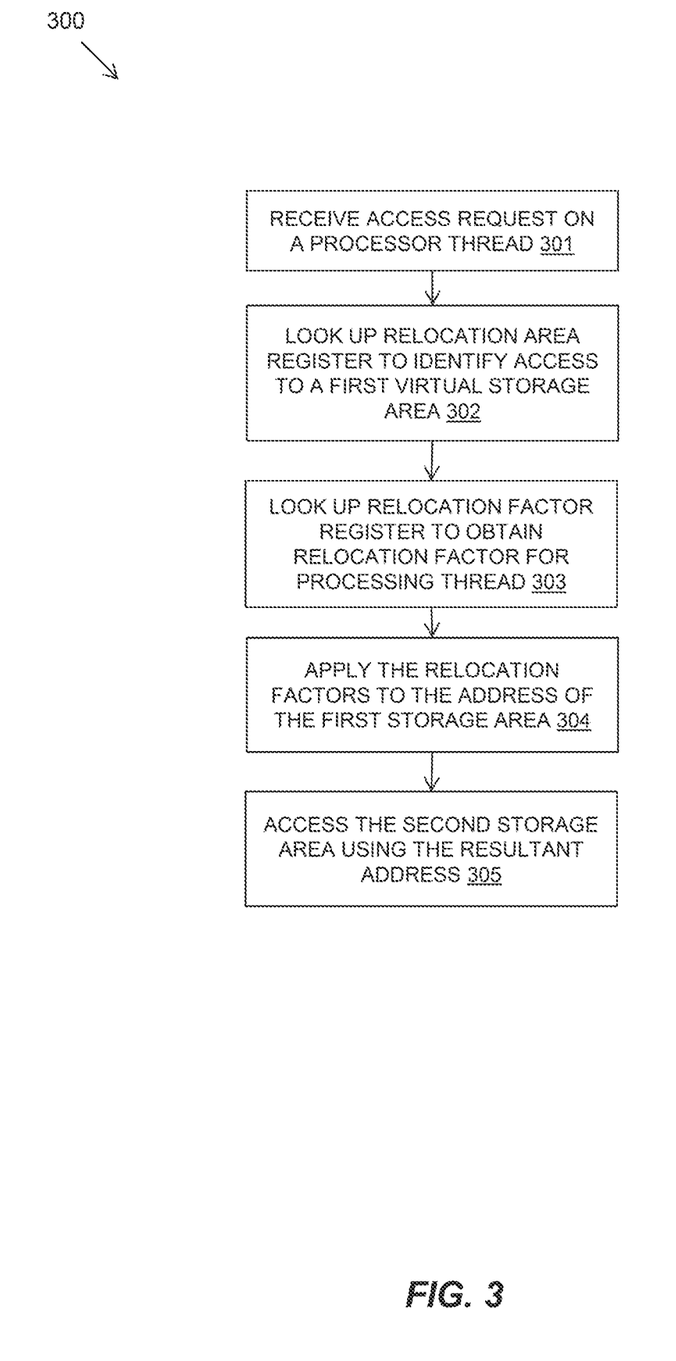
FIG. 3 is a flow diagram of an example embodiment of another aspect of a method in accordance with the present invention.

Referring to FIG. 3, a flow diagram 300 shows an example embodiment of a method for accessing instructions or data stored using the described storage method. A relocation mechanism may carry out the described accessing method.

For any one program while it is executing, there are two virtual storage areas in the same address space. The first storage area is located within that part of the address space where smaller width addresses suffice, the second storage area is one of a set of areas located within the much larger part of the address space which requires larger width addresses. A relocation mechanism is provided that allows a thread to use addresses within the first storage area to access the executable code that is located within the second storage area.

An access request is received 301 using a smaller memory-address width addressing mode in a processor thread and a look up is carried out 302 to the relocation area register for the processor thread to identify any accesses to storage within the first storage area of the address space where smaller address widths suffice.

The method looks up 303 the relocation factor register to obtain the relocation factor associated with the processor thread. The obtained relocation factor is applied 304 to the smaller memory-address width address and the resultant address is used 305 to access storage in the second storage area which requires larger width addresses. This method is used for both instruction accesses and data accesses.

Figure 4:
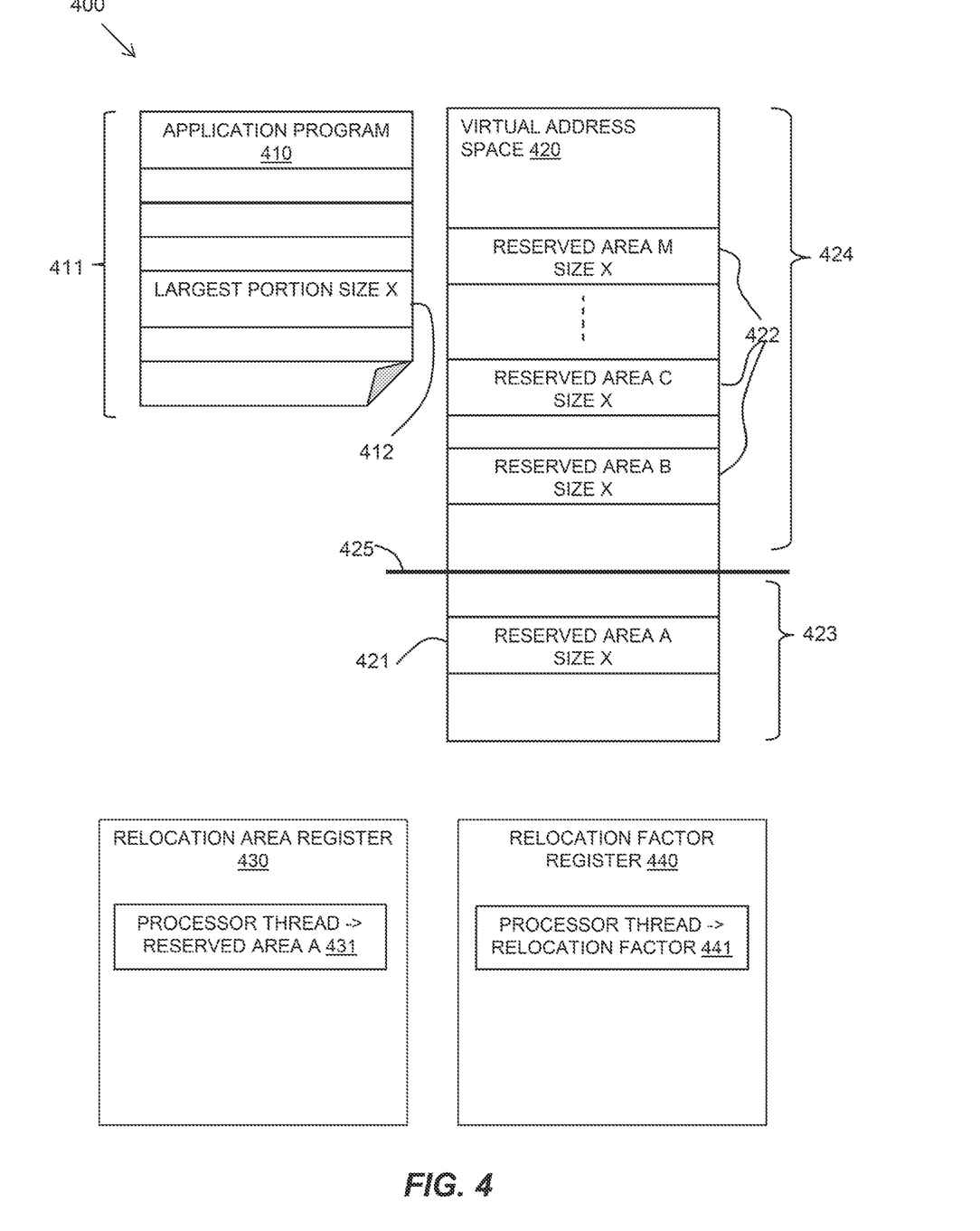
FIG. 4 is a schematic diagram illustrating the method in accordance with the present invention.

Referring to FIG. 4, a schematic diagram 400 illustrates the described method. An application program 410 is divided into n portions 411, with the largest portion 412, having size x. A virtual address space 420 is provided with a divide 425 between a smaller memory-address width address space 423 and the rest of the address space 424. In the case of the smaller memory-address width address being a 31-bit address, the divide 425 is the "bar" at 2 GB.

A first area A 421 of size x is reserved in the smaller memory-address width address space 423 and a set of n areas (areas B, C, . . . M) 422 of size x are reserved in the rest of the address space 424. A relocation area register 430 is provided to identify 431 the reserved area A 421 as being for a processor thread and a relocation factor register 440 is provided to provide a relocation factor 441 for the processor thread to translate first area addresses to one of the set of areas 422 in the rest of the address space 424.

The described method allows a portion of the application code to reside in one of the reserved areas of above-the-bar storage and run with AMODE-31. Any code running in that processor thread accesses all the storage within the above-the-bar area using 31-bit addresses within the reserved below-the-bar storage area. References to storage outside the above-the-bar area, such as calls to services provided by the runtime or the operating system and references to data owned by the runtime or the operating system, are unaffected by the relocation process. Code in the application, and code in the runtime that the application calls, work the same way as when the application code resides in the below-the-bar area.

The method uses the described capability to reduce the below-the-bar storage required for AMODE-31 application code. To achieve this, the runtime uses different above-the-bar storage areas for different portions of the application code but relocates the same range of below-the-bar addresses of the reserved below-the-bar area to these different above-the-bar storage areas.

The runtime ensures that the correct relocation factor is in the relocation factor register for a processor thread that is using application code in that portion. Since the relocation factor register is a hardware component, it is likely the runtime should call an operating system service to set its contents.

Dividing Application Code into Portions

The above embodiment does not allow one smaller memory-address width application code portion to access storage in a different smaller memory-address width application code portion. Equivalently, when one application program accesses storage in another application program, both programs must be in the same portion. The following discussion of the aspect of dividing application code into portions addresses this.

When one application program calls another, it typically uses one of the following linkage mechanisms for entry and return point addresses.

In a first mechanism, a static linkage is provided. The calling program "knows" the storage address of the called program entry-point. It branches to that address and passes the return address (within itself) as an argument. The called program returns by branching to that return address. It uses a linker or similar mechanism to combine the set of interlinked programs into a single executable object using a static library, this may be referred to as a load module in z/Architecture (z/Architecture is a trademark of International Business Machines Corporation). This means that static linkage calls and returns access storage that is necessarily in the same load module.

In the described method, the application code is divided into portions that each contain a single object of executable statically linked programs within one portion. In other words, a load module is in one portion when the code is divided.

In a second mechanism, a dynamic linkage may be provided. In this case, the calling program does not know the storage address of the called program; in some cases, the runtime does not load the called program into memory until the call is issued. The calling program invokes a runtime service and passes a name or other token that identifies the target program entry-point and passes a return address. The runtime service calls the target program after loading it into memory if applicable. This is a dynamic linkage that allows interlinked programs to be in different executable objects.

In the described method, dynamic linkage calls and returns are handled by the runtime which consequently can change the relocation factor register, if required. This allows the different load modules to be in different portions.

When one code portion dynamically links to another, the relocation value used in the from code portion must be replaced by the value required for the code portion. That is because the two code portions each use the same "first area" in turn, but a different "second area". As the dynamic linkage mechanism uses code that is not part of the application, that code is in a position to change the value in the relocation register during the linkage process.

Variations of dynamic linkage include cases where the program that loads application load modules constructs a table containing entry-point addresses. Application programs in other load modules can load the required entry-point address from the table and branch directly to the target program (somewhat similar to a static linkage call). It is possible to modify the program or programs that build tables in this way so that they save the address of a "glue" program instead of the address of the target entry-point itself. The glue program can invoke conventional dynamic linkage and so allow the load module containing the target entry-points to be in a separate portion.

Calling programs usually pass data as arguments to called programs. The called programs receive the arguments as parameters. Typically, an argument is either the address of the data (call by reference) or the value of the data (call by value).

In the call by reference case, the data itself can be within the calling program's portion. If it is, then the calling program must be in the same portion as the called program or it must be excluded from the relocation process entirely.

In either case, the data can be an address. If it is the address of storage within the calling program's portion, then the calling program must be in the same portion as the called program or it must be excluded from the relocation process entirely.

Alternatively, it may be possible to change the call so that it copies the referenced data into dynamic storage and passes the address of that dynamic storage instead. This can be achieved by having the compiler generate different call logic or by having "thunking" code statically included or invoked by linkage service in the runtime.

If the application programs are re-entrant then any data within the programs is kept constant.

To summarize, a load module is a natural choice for a portion because direct references from one program to another commonly mediated by the linker (or similar) and are constrained to be within the load module.

Linkages between different load modules do not necessarily prevent the load modules from being in separate portions. When they do prevent it, the called and calling programs can be included in the same portion.

In some cases, when the target is widely used, copies of the target program may be included in multiple portions or the target may be excluded from the relocation process entirely and handled as a conventional RMODE smaller memory-address width program.

Figure 5:
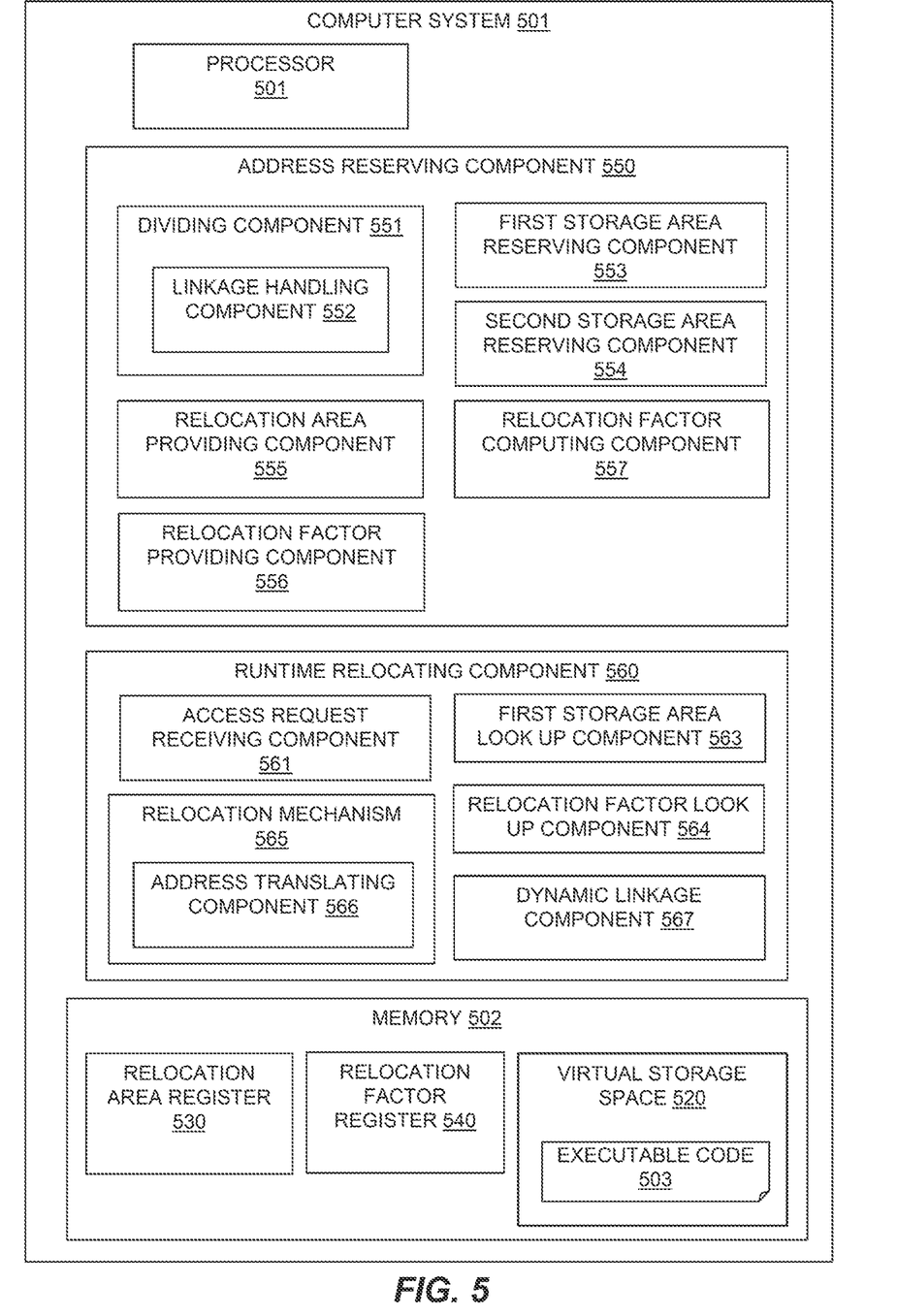
FIG. 5 is block diagram of an example embodiment of a system in accordance with the present invention.

Referring to FIG. 5, a computing system 500 is shown including at least one processor 501, a hardware module, or a circuit for executing the functions of the described components which may be software units executing on the at least one processor. Multiple processors running parallel processor threads may be provided enabling parallel processing of some or all of the functions of the components.

Memory 502 may be configured to provide computer instructions to the at least one processor 501 to carry out the functionality of the components. A virtual storage space 520 is provided for accessing stored executable code 503 with an associated relocation area register 530 and a relocation factor register 540.

The computer system 500 includes an address reserving component 550 for providing code address translation as described herein to provide address relocation that allows smaller memory-address width programs to reside outside the smaller memory-address width addressable portion of a larger memory-address width address space and run in smaller memory-address width addressing mode.

The computer system 500 also includes a runtime relocating component 560 for providing address relocation during runtime to smaller memory-address width programs residing outside the smaller memory-address width addressable portion whilst running in smaller memory-address width addressing mode.

Since the relocation factor register 540 is a hardware component, the runtime relocating component 560 may call an operating system service to set its contents. The operating system may restrict which programs can set the relocation factor register and the typical way to do this is to only allow operating system code to issue the instruction that sets the value. Other code may therefore need to invoke an operating system service that sets the required value on its behalf.

The address reserving component 550 may include: a dividing component 551 for dividing a smaller memory-address width application program executable code into a set of portions. The dividing component 551 may include a linkage handling component 552 for accommodating linkage requirements when dividing including providing a single executable object of statically linked programs within one portion.

The address reserving component 550 may include: a first storage area reserving component 553 for reserving a first virtual storage area in a part of an address space accessed using a smaller memory-address width address; and a second storage area reserving component 554 for reserving a set of second storage areas in a part of the address space accessed using a larger memory-address width address to accommodate the program executable code.

The address reserving component 550 may include a relocation factor computing component 557 for computing a relocation factor for a processor thread for each of the set of second storage areas based on the address of the first storage area such that adding the relocation factor to an address at a displacement within the first storage area gives an address at the same displacement within a second storage area.

The address reserving component 550 may include: a relocation area providing component 555 for providing the relocation area register 530 to allow a processor thread to identify the reserved first storage area; and a relocation factor providing component 556 for providing the relocation factor register 540 with a relocation factor for the processor thread to access the set of second storage areas based on a translation of an address within the first storage area.

The runtime relocating component 560 may include an access request receiving component 561 for receiving an access request to executable code of the application program on a processor thread. The runtime relocating component 560 may include a first storage area look up component 563 for looking up the relocation area register 530 for the processor thread to identify a reserved first storage area and a relocation factor look up component 564 for looking up a relocation factor register 540 for the processor thread to obtain a relocation factor.

The runtime relocating component 560 may include a relocation mechanism 565 with an address translating component 566 for translating using the relocation factor from an address in the reserved first storage area to the set of second storage areas to access the executable code in the set of second storage areas.

The runtime relocating component 560 may include a dynamic linkage component 567 for changing a relocation factor register during a runtime to accommodate dynamic linkage calls and returns.

Figure 6:
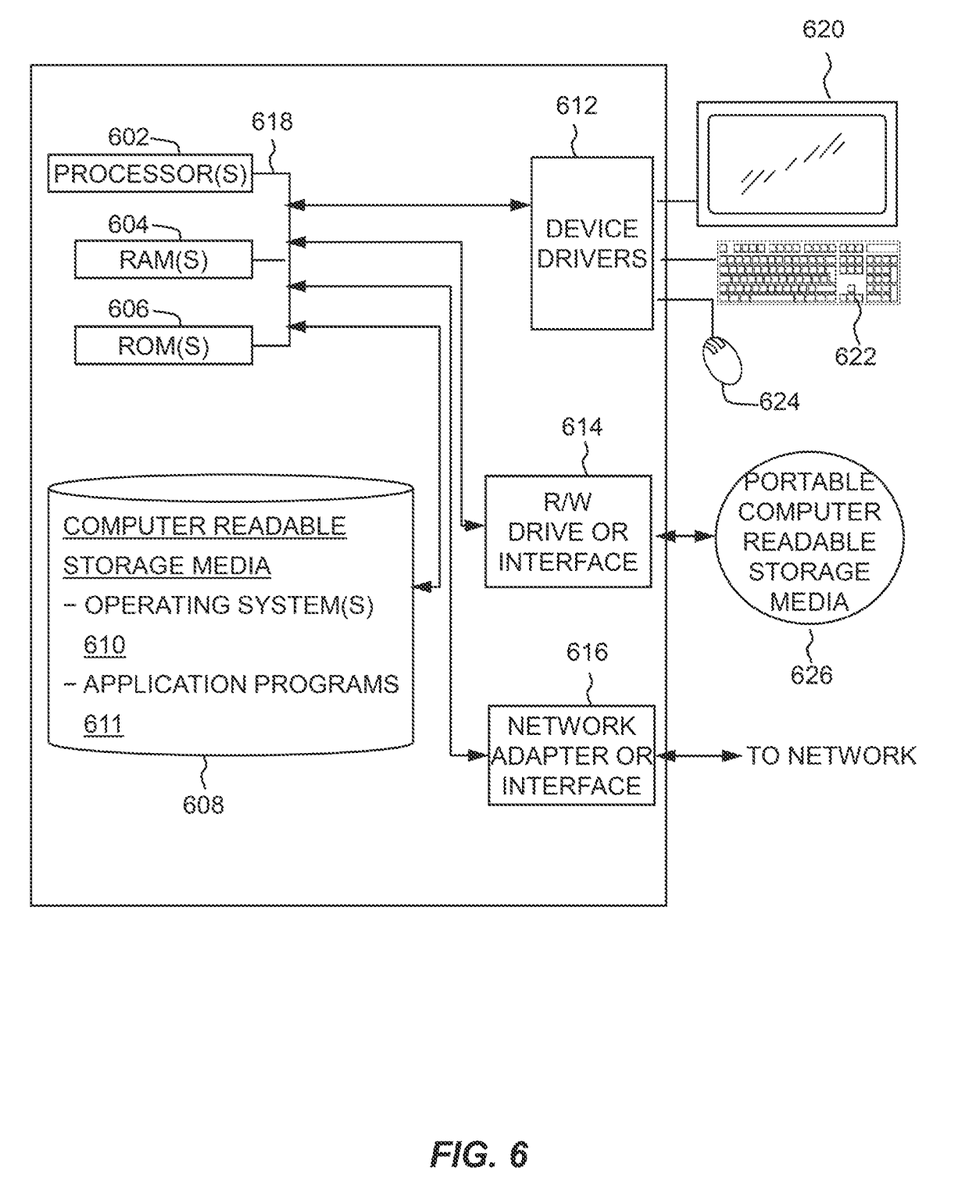
FIG. 6 is a block diagram of an embodiment of a computer system or cloud server in which the present invention may be implemented.

FIG. 6 depicts a block diagram of components of a computing system 500 in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the executable code address reserving component 550 and the executable code runtime relocation component 560, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
   providing a virtual address space of a memory of a computer system, the virtual address space comprising a first reserved virtual storage area in a below-the-bar smaller memory-address width address space and a set of second reserved virtual storage areas in an above-the-bar larger memory-address width address space, the set of second reserved virtual storage areas to accommodate program executable code;
   storing the program executable code above-the-bar in the set of second reserved virtual storage areas of the memory, the program executable code comprising a first addressing mode for below-the-bar storage addresses;
   providing a relocation factor for a processor thread, wherein the set of second reserved virtual storage areas containing the program executable code is based on the relocation factor and an address in the first reserved virtual storage area; and
   executing the program executable code using the first addressing mode while the program executable code is stored above-the-bar, the program executable code comprising a set of portions having at least a largest portion.

2. The method as claimed in claim 1, including:
   providing a relocation area register for the processor thread; and
   providing a relocation factor register with the relocation factor for the processor thread.

3. The method as claimed in claim 1, wherein different relocation factors are provided for different threads and for a same thread at different times to access different sets of the set of second reserved virtual storage areas obtaining different executable code using a same first virtual storage area.

4. The method as claimed in claim 1, wherein a larger memory-address width address in the set of second reserved virtual storage areas is based on the relocation factor and a displacement to the smaller memory-address width address in the first reserved virtual storage area.

5. The method as claimed in claim 1, wherein the relocation factor for the processor thread for each of the set of second reserved virtual storage areas is based on the address of the first reserved virtual storage area, and wherein a displacement within the first virtual storage area gives a first address at the same displacement within a second virtual storage area based on the relocation factor and a second address.

6. The method as claimed in claim 1, further comprising providing a single object of executable statically linked programs within one portion of a smaller memory address width program executable code.

7. The method as claimed in claim 1, further comprising providing a calling program in a same portion of the memory as a called program.

8. The method as claimed in claim 1, wherein the smaller memory-address width address is one of a group of: an 8-bit address, 16-bit address, 24-bit address, 31-bit address, or 32-bit address, and the larger memory-address width address is a 32-bit address or a 64-bit address.

9. The method as claimed in claim 1, wherein the smaller memory-address width address is a 31-bit address and the larger memory-address width address is a 64-bit address, and wherein the first reserved virtual storage area is in a first 2 GB of address space and the set of second reserved virtual storage areas are beyond the first 2 GB of address space.

10. A computer program product comprising one or more computer-readable storage media having program instructions embodied therewith, the program instructions executable by one or processors to cause the one or more processors to perform a method comprising:
    providing a virtual address space of a memory of the one or more computer-readable storage media, the virtual address space comprising a first reserved virtual storage area in a below-the-bar smaller memory-address width address space and a set of second reserved virtual storage areas in an above-the-bar larger memory-address width address space;
    at a runtime of program executable code comprising a first addressing mode for below-the-bar storage addresses, receiving a request to access the program executable code on a processor thread;
    accessing the set of second reserved virtual storage areas in a part of an address space of the memory using an above-the-bar larger memory-address width address accommodating the program executable code, wherein the part of the address space is based on a relocation factor and an address in the first reserved virtual storage area, and wherein the set of second reserved virtual storage areas contains the program executable code; and
    executing the program executable code in the first reserved virtual storage area using the first addressing mode while the program executable code is stored above-the-bar.

11. A computer program product as claimed in claim 10, wherein the relocation factor is stored in a relocation factor register.

12. A computer program product as claimed in claim 10, wherein a larger memory-address width address in one of the first reserved virtual storage area or the second set of reserved virtual storage areas is based on the relocation factor and a displacement to a smaller memory address width address in the first reserved virtual storage area.

13. A computer program product as claimed in claim 10, wherein during the runtime, an operating system service changes the relocation factor stored in a relocation factor register based on providing dynamic linkage calls and returns between portions of the program executable code.

14. A computer system comprising:
    a virtual address space comprising a first reserved virtual storage area in a below-the-bar smaller memory-address width address space and a set of second reserved virtual storage areas in an above-the-bar larger memory-address width address space, the set of second reserved virtual storage areas to accommodate program executable code; and one or more processors and a memory communicatively coupled to the one or more processors, wherein the memory stores program instructions that, when executed, enables the one or more processors to:

store the program executable code above-the-bar in the set of second reserved virtual storage areas, the program executable code comprising a first addressing mode for below-the-bar storage addresses;

provide a relocation factor for a processor thread, wherein the set of second reserved virtual storage areas containing the program executable code is based on the relocation factor and an address in the first reserved virtual storage area; and execute the program executable code using the first addressing mode while the program executable code is stored above-the-bar, the program executable code comprising a set of portions having at least a largest portion.

15. The computer system as claimed in claim 14, further comprising: providing a relocation area register for the processor thread.

16. The computer system as claimed in claim 15, further comprising:

receiving a request to access the program executable code on the processor thread;

accessing the set of second reserved virtual storage areas in a part of an address space of the memory using an above-the-bar larger memory-address width address accommodating the program executable code, wherein the part of the address space is based on the relocation factor and an address in the first reserved virtual storage area, and wherein the relocation factor is stored in a relocation factor register.

17. The computer system as claimed in claim 16, wherein at runtime of the program executable code, an operating system service changes the relocation factor stored in the relocation factor register based on providing dynamic linkage between portions of the program executable code.

18. The computer system as claimed in claim 16, wherein a runtime relocating component calls an operating system service to set the relocation factor register, and wherein the relocation factor stored in the relocation factor register represents either a 64-bit or a 31-bit displacement.

19. The computer system as claimed in claim 14, wherein the relocation factor for the processor thread for each of the set of second reserved virtual storage areas is based on the address of the first virtual storage area, and wherein a displacement within the first virtual storage area gives a first address at the same displacement within a second virtual storage area based on the relocation factor and a second address.

20. The computer system as claimed in claim 14, further comprising: providing a single object of executable statically linked programs within one portion of the program executable code.

* * * * *